United States Patent

Prete, Jr.

[15] 3,677,195
[45] July 18, 1972

[54] ANCHOR FITTING FOR RETAINING ARTICLES IN A RETAINER TRACK

[72] Inventor: Ernest Prete, Jr., Woodland Hills, Calif.

[73] Assignee: Ancra Corporation, El Segundo, Calif.

[22] Filed: Sept. 3, 1971

[21] Appl. No.: 177,788

[52] U.S. Cl. .................................. 105/369 A, 248/361 A
[51] Int. Cl. .............................. B61d 45/00, B60p 7/08
[58] Field of Search ................. 105/366 R, 368 T, 369 A; 248/361 R, 361 A, 119 R; 280/179 A

[56] References Cited

UNITED STATES PATENTS

| 2,422,693 | 6/1947 | McArthur | 105/369 A |
| 2,688,289 | 9/1954 | Sterling | 105/369 A |
| 2,743,684 | 5/1956 | Elsner | 105/369 A |
| 3,282,229 | 11/1966 | Elsner | 105/369 A |
| 3,306,234 | 2/1967 | Hansen et al. | 105/369 A |
| 3,334,718 | 8/1967 | Davidson | 105/369 A |
| 3,344,749 | 10/1967 | Bass et al. | 105/369 A |
| 3,507,224 | 4/1970 | Sweger | 105/366 R |
| 3,584,824 | 6/1971 | Belcer | 248/361 R |
| 3,593,387 | 7/1971 | Georgi | 248/361 R |
| 3,612,466 | 10/1971 | Arnold | 248/361 R |

Primary Examiner—Drayton E. Hoffman

[57] ABSTRACT

An anchor fitting has a pad member which fits into a slot of a track having a plurality of notched portions separated by narrow neck portions. The fitting has a camming lever which may be operated to drive a follower plate to cause the pad member, when it is positioned in the track in the slot opposite the neck portions, to be driven against such neck portions in holding engagement therewith.

14 Claims, 8 Drawing Figures

Patented July 18, 1972 3,677,195

ANCHOR FITTING FOR RETAINING ARTICLES IN A RETAINER TRACK

This invention relates to an anchor fitting and more particularly to such a device suitable for removably securing articles such as seats, cargo, etc., to a track member, which may be attached to the floor of a vehicle such as an aircraft.

In my U.S. Pat. application Ser. No. 68,942, filed Sept. 2, 1970, now U.S. Pat. No. 3,605,637 and assigned to Ancra Corporation, the Assignee of the present application, an anchor fitting is described for anchoring various types of loads such as cargo, passenger seats and the like, in various positions along the floor of an aircraft. As pointed out in this prior application, such anchoring must be secure and reliable to assure that these loads do not become loose during travel so as to avoid any hazard to passengers or damage to cargo. It is also noted in this prior application that it is necessary that it be relatively easy to attach and detach the anchoring means in any selected position in the vehicle so as to permit versatility in loading and conversion from use for one type of a load to another, as when converting between passenger and cargo handling capabilities. As further noted in this prior application, a particular type of track structure has come into general use comprising an elongated slotted track member having spaced notches formed therein separated by flange portions, this track being adapted to receive an anchor fitting within the slotted portion thereof.

The device of this invention is of the same general type as described in the aforementioned patent application, and affords certain advantages thereover and over other anchor fittings of the prior art in providing a unique camming lever mechanism which facilitates the securing of the fitting to a track and its release therefrom. While my prior device had the advantage of easy engagement and disengagement from the track, the camming lever mechanism of the present invention significantly facilitates such operations and cuts down the time required therefor. It is to be noted along these lines that even a few moments saving of time in performing the operations in question can have considerable significance when multiplied by the many attachment fittings utilized in a large aircraft, and hence any means to facilitate and speed up these operations can have significant importance in an airline operation. Further, the device of this invention is snugly held in the track so as to be substantially free of rattle.

It is therefore an object of this invention to facilitate the securing and unsecuring of an anchor fitting for retaining loads in a vehicle.

It is another object of this invention to provide an improved camming lever mechanism for securing and unsecuring an anchor fitting with a retaining track member.

It is a further object of this invention to provide an anchor fitting for retaining loads to a track member, which is substantially rattle proof.

It is still another object of this invention to speed up the time required for securing and unsecuring an anchor fitting to a mating track member.

Other objects of this invention will become apparent as the description proceeds in connection with the accompanying drawings, of which:

Briefly described, the device of the invention comprises pad member means which subtends from the main body of an anchor fitting and which is adapted to fit into a slot formed in a track member. The track member includes a plurality of notched portions separated by neck portions. The fitting further includes a plate member which is supported for slidable motion relative to the broad surfaces of the pad means. A camming lever arm is supported for rotation in a direction substantially parallel to said broad surfaces and coacts with a cam follower on a camming plate to bring the pad member into holding engagement against the neck portion of the track member. In the preferred embodiment, the slidable plate and the cam follower plate are one and the same, this plate further including protrusions thereon which fit into the notched portions of the track to provide retaining action against shear loads. In another embodiment separate plates are utilized for coaction with the camming lever and to coact with the track in retaining the pad member, the second embodiment not incorporating protrusions for handling shear loads.

Figure 1:
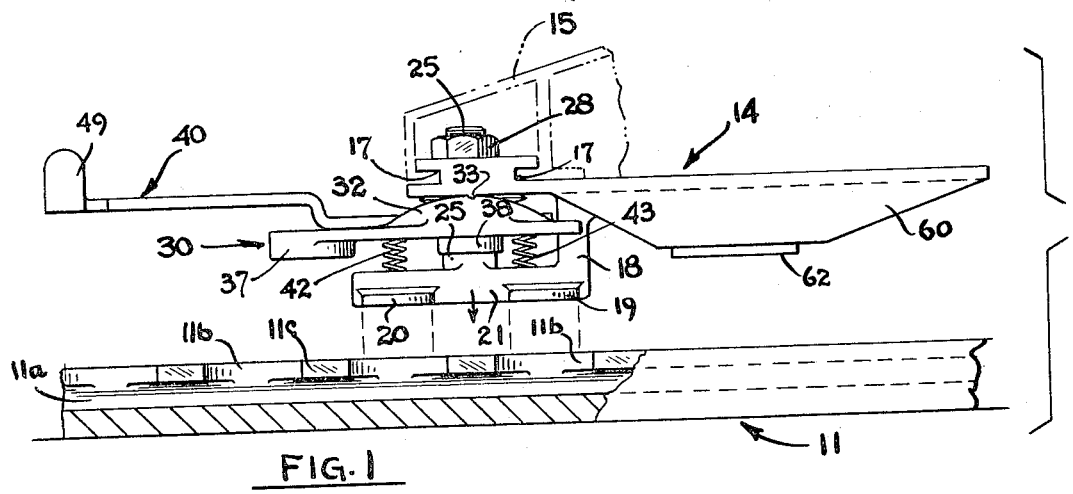
FIG. 1 is a side elevation view illustrating a preferred embodiment of the device of the invention, along with a track member in which it may be installed.
Figure 2:
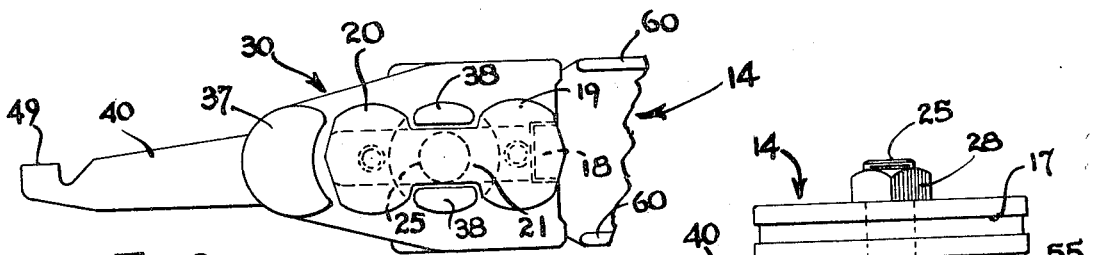
FIG 2 is a bottom plan view of the embodiment of FIG. 1.
Figures 3, 4:
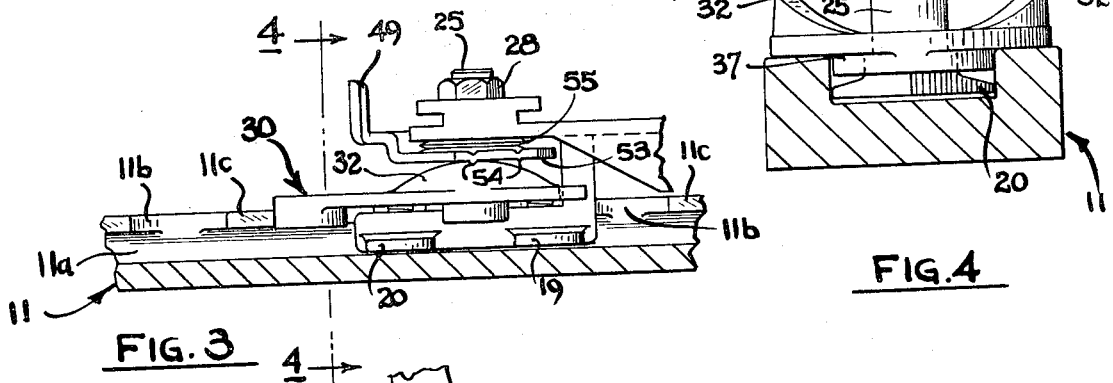
FIG 3 is a side elevational view of the preferred embodiment as installed in a mating retainer track.
FIG 4 is a cross sectional view taken along the plane indicated by 4—4 in FIG. 3.
Figure 5:
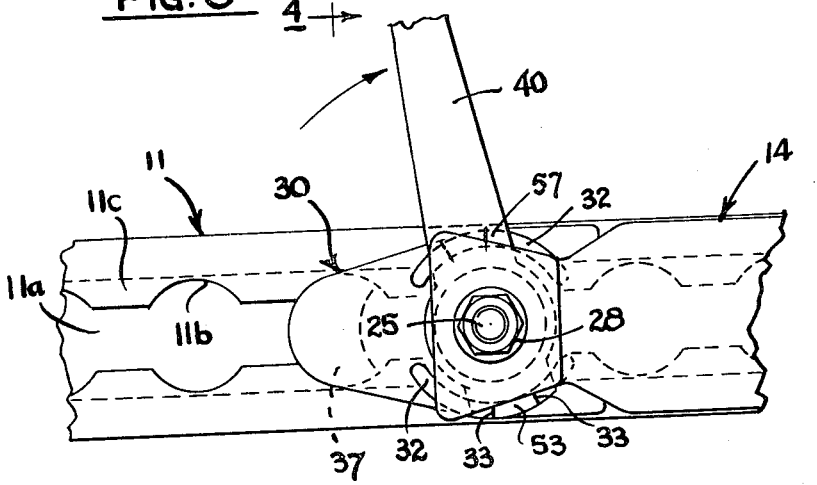
FIG 5 is a top plan view illustrating the preferred embodiment in its installed retained position in a track member.

Referring now to FIGS 1–5, a preferred embodiment of the device of the invention is illustrated. Referring initially to FIGS 1 and 2, the device is shown as it is about to be installed in a track member 11. The track member as already noted has a slot 11a running therealong with a series of notched portions 11b separated by neck portions 11c. The structure of the track can be better appreciated by additionally referring to FIG 5. The fitting has a main body portion 14 which is attached to the structure 15 of articles to be secured by means of bolts (not shown) or any other suitable means. The retention of main body portion 14 to structure 15 is further aided by means of slots 17 formed in the main body portion which matingly receive ledge portions of the structure.

Subtended from main body portion 14 on arm 18 are pad members 19 and 20 which extend substantially normally from arm portion 18 and are interconnected by a neck portion 21. Pad portions 19 and 20 are made so that they can readily fit into notched portions 11b and at the same time are wider than the spacing between neck portions 11c so that they can be retained under these neck portions with the fitting in its secured position. Post member 25 which is fixedly joined to neck portion 21 extends upwardly from the neck portion and is secured to the frame 14 by means of nut 28.

Slidably mounted on post 25 is plate member 30 which has an apertured central portion (not shown) which fits over the post. Plate 30 has a pair of sloping raised protrusions 32 formed on the opposite side thereof that form cam followers for camming lever 40. Plate member 30 also has a protrusion 37 extending downwardly therefrom, which is adapted to matingly fit within a slot 11b of the track, and a pair of downwardly extending protrusions 38 which are adapted to fit along the sides of neck portion 21, and which together also afford a mating fit into one of the notches 11b. Plate 30 is resiliently urged away from pads 19 and 20 by means of springs 42 and 43, which are placed between these members and retained in recesses (not shown) formed therein.

Camming lever 40 includes a handle portion 49 at the end thereof and is rotatably supported on post 25, the lever having an aperture formed therein, this aperture portion being fitted over the post. Camming lever 40 has camming plate portions 53 and 57 near the end thereof opposite to handle 49. Camming plate portions 53 and 57 have pairs of detent ridges 54 which matingly engage detents 33 formed in cam follower 32. A pair of such ridges are utilized on opposite sides of the camming plate portions to permit holding engagement of the camming lever in either of two positions, this to facilitate operation of the device particularly when working in close quarters. A pair of Belleville washers 55 are placed between the camming lever and the main frame to resiliently urge the lever away from the frame. This makes the device rattle proof. Subtending downwardly from the main frame are a pair of arms 60 which have a plate 62 extending therebetween, which may be of a material such as Teflon. Plate 62 abuts against the top surface of the track and aids in the holding action when the fitting is in its retained position.

The fitting is retained to the track in the following manner: First, pad members 19 and 20 are placed into a pair of succeeding notches 11b of the track, as indicated in FIG 1. The unit is then slid along the track until the pad portions 19 and 20 are underneath a pair of succeeding neck portions 11c of the track with protrusions 37 and 38 above the notched portions 11b. Camming lever 40 is then moved from its position substantially along the longitudinal axis of track 11, as shown in FIG 1, to the position substantially at right angles to the longitudinal axis of the track as shown in FIGS 3-6. With such motion, the camming plate portions 53 and 57 of the lever, which are located opposite the two cam follower portions 32 of the plate 30, ride along these cam follower portions and drive the plate downwardly to the position shown in FIGS 3-5. Lever 40 is brought to a final resting position with detent ridges 54 held in place in detents 33. The fitting is tightly retained in the track in this position by virtue of the fact that plate 30 is held in abutment against the top surface of the track with the upper surfaces of pads 19 and 20 abutting against the under surfaces of neck portions 11c of the track. Also, protruding portions 37 and 38 of plate 30 are inserted in a pair of notches 11b of the track and thus act to hold against shear loads. It is to be noted that camming lever 40 can be positioned on either side of the device in view of the symmetrical construction thereof, thus facilitating installation under various conditions that may be encountered in the field. This operation from either the left or the right side also obviates the need for separate units to accommodate for application requirements demanding operation of the lever from one side or the other.

Figure 6:
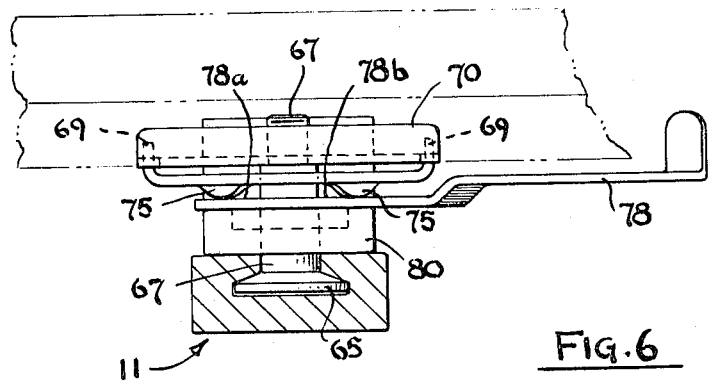
FIG 6 is an elevational view of a second embodiment of the device of the invention as installed in a mating track member.
Figure 7:
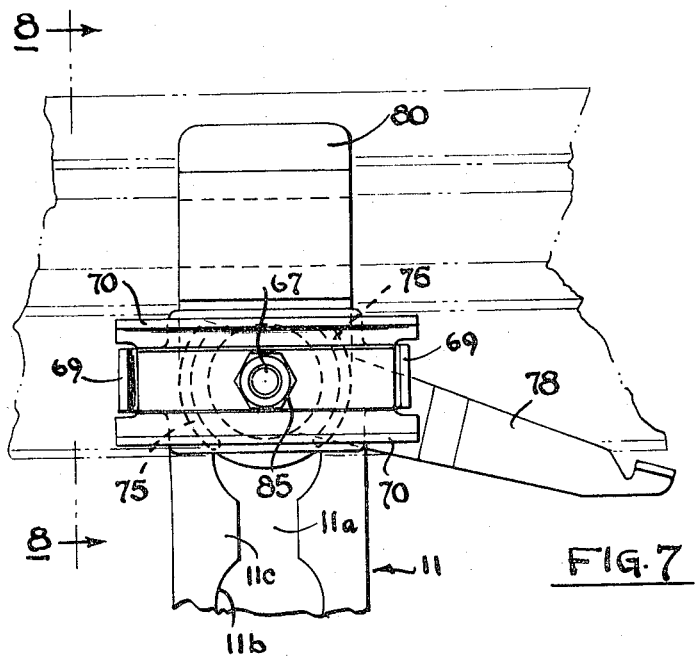
FIG 7 is a top plan view of the embodiment of FIG 6.
Figure 8:
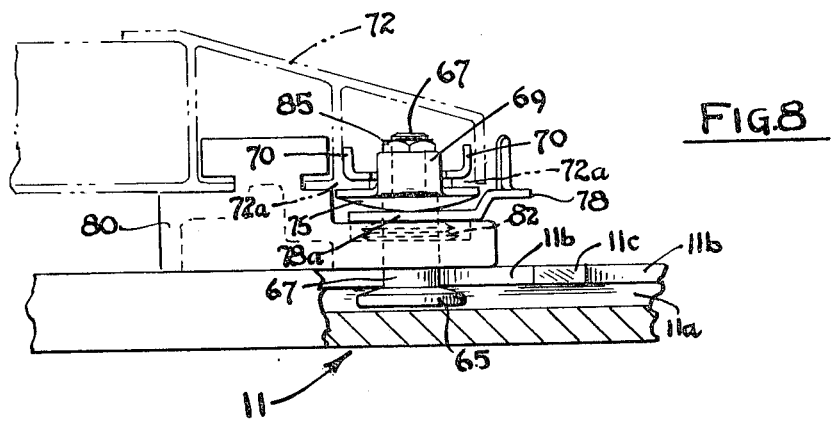
FIG 8 is a view taken along the plane indicated by 8—8 in FIG 7.

Referring now to FIGS. 6-8, a second embodiment of the device of the invention is illustrated. This embodiment is much simpler than the first and is generally only used for locking down a portion of an article to be secured with the main holding action being provided by a device such as that just described. Thus, for example, the simpler device can be used to advantage in holding the forward part of a vehicle seat in place with the first described embodiment being utilized for the rear portion to provide the principal retaining action. The second embodiment includes a single pad member 65 which is supported on post member 67 which is fixedly attached to plate portion 70 of the fitting by means of nut 85. The structure of the fitting is fixedly attached to the structure 72 of the article to be secured by clamping attachment, ledge portions 72a being grasped between plate portion 70 and plate portion 69, the latter of which is slidably mounted on post 67. Plate portion 69 has a pair of protrusions 75 which form cam follower surfaces for camming lever 78. Camming lever 78 is rotatably mounted on post 67, this end result being achieved by virtue of an aperture (not shown) formed in the lever which is fitted over the post. As for the first embodiment, Belleville washers 82 are placed between the camming lever and plate 80 to make the device rattle free. Also slidably fitted over post 67 is a locking plate 80, this plate having an aperture formed therein through which the post fits. Plate 80 has a flat surface which in the retained position, as can best be seen in FIG 8, abuts against the top surface of track 11.

In installing the fitting in the track, pad portion 65 is first inserted into one of the notched portions 11b of the track and then slided along the track until it is underneath one of the neck portions 11c, as shown in FIG 8. Lever 78 is then moved from a position substantially parallel to the longitudinal axis of the track to the position as shown in FIGS 6-8 almost normal to the longitudinal axis of the track, in which position the camming surfaces 78a and 78b of the lever ride up along cam followers 75. This causes pad member 65 to be drawn against the inner surface of neck portion 11c with plate 80 being drawn against the top surface of the track. As for the first embodiment, ridges and mating detents may be provided respectively in camming lever 78 and cam followers 75.

The device of this invention thus provides a simple reliable structure for the rapid securing and unsecuring of an anchor fitting member in a retaining track. The structure is such that it can be applied with a great deal of versatility in various types of installations, and can be operated rapidly and easily in situations involving difficulties of access.

While the device of this invention has been described and illustrated in detail, it is to be clearly understood that this is intended by way of illustration and example only and is not to be taken by way of limitation, the spirit and scope of this invention being limited only by the terms of the following claims.

I claim:

1. In an anchor fitting for attachment to a track member having a longitudinal slot formed therein and spaced notched portions separated by neck portions, said anchor assembly including a main body portion, a post member subtending from said body portion and pad means supported on said post portion, said pad means being adapted to fit into the notched portions of said track and into the slot under said neck portions thereof, the improvement comprising a camming mechanism for bringing said pad means into holding engagement against the neck portions of the track member so as to retain the anchor fitting therein, said mechanism comprising:

a plate member slidably mounted on said post for motion parallel to the longitudinal axis thereof, said plate member having cam follower means thereon, and a camming lever mounted on said post for rotatable motion about the longitudinal axis of said post, said camming lever having camming surfaces in juxtaposition to the cam follower means and a lever arm extending from the longitudinal axis of said post, whereby with rotational motion of said camming lever said camming surfaces drive said cam follower means so as to bring said pad means into holding engagement with the neck portions of said track member.

2. The device of claim 1 wherein said cam follower means comprises a pair of oppositely positioned similar protrusions on said plate member.

3. The device of claim 2 wherein said cam follower protrusions have detent notches formed therein, the camming surfaces of said camming lever having ridges formed therein adapted for mating engagement with said detent notches.

4. The device of claim 1 and further including holding plate means slidably mounted on said post and interposed between said camming lever and said pad, whereby when said camming lever is rotatably positioned to cause said camming surface to drive against said cam follower means, said holding plate is driven against the surface of said track member.

5. The device of claim 1 wherein said plate means is positioned between said pad means and said camming lever such that when said lever is rotated so as to drive against said cam follower means, the plate means is driven downwardly into tight engagement with the surface of said member.

6. The device of claim 5 wherein said plate member further includes protrusions extending downwardly therefrom, said protrusions being adapted to fit into the notched portions of said track member when said plate member is driven downwardly by said camming lever.

7. The device of claim 5 wherein said pad means comprises a peir of spaced pad members interconnected by a neck portion and spring means for resiliently urging said plate member away from said pads.

8. The device of claim 7 and further including a pair of arm portions extending from said frame and a flat cross plate interconnecting said arm portions, said flat plate being brought against the surface of said track when said camming lever is brought to the securing position.

9. The device of claim 1 and additionally including means for resiliently urging the camming lever against said camming surfaces to prevent rattle.

10. In an anchor fitting for attaching articles to a track member, said track member having a longitudinal slot and spaced notch portions separated by neck portions formed therein, said assembly further including a main frame portion, a post member subtended at one end thereof from said main frame portion and a pair of pad members supported at the other end of said post portion, said pad portions having flat surfaces extending substantially normal to the longitudinal axis of said post portion, said pad members being adapted to fit through the notch portions of said track member into said slot and underneath said neck portions, the improvement comprising a camming mechanism for bringing said anchor fitting into retained relationship with said track member with said pad portions pressing against the neck portions thereof, said latching mechanism comprising:

a camming lever mounted on said post for rotation about the longitudinal axis thereof, a plate member slidably mounted on said post interposed between said camming lever and said pads, said plate member having sloped protrusion means thereon forming cam followers, said camming lever having camming surfaces thereon which engage said cam follower means when said lever is rotated, causing said plate to be driven downwardly against the surface of said track member, thereby causing said pads to be drawn against said neck portions.

11. The device of claim 10 wherein said plate member further includes protrusions thereon which matingly fit into said notch portions of said track member when said plate member is driven downwardly by the action of said camming lever.

12. The device of claim 10 wherein said cam follower means comprises a pair of similar sloping protrusions positioned opposite each other on said plate.

13. The device of claim 12 wherein said protrusions have detent notches formed therein, said camming lever having detent ridges therein which matingly engage said detent notches.

14. The device of claim 10 and additionally including means for resiliently urging said camming lever against said cam followers to avoid rattle therebetween.

* * * * *